United States Patent
Whitworth et al.

(10) Patent No.: US 8,192,250 B2
(45) Date of Patent: Jun. 5, 2012

(54) ABRASIVE ARTICLE

(75) Inventors: Denver Whitworth, North Richland Hills, TX (US); Shana Deering, Haslet, TX (US); Vance Cribb, Grapevine, TX (US); Dumitru Radu Jitariu, Flower Mound, TX (US); Karen Sem, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 12/990,572

(22) PCT Filed: Apr. 30, 2009

(86) PCT No.: PCT/US2009/042334
§ 371 (c)(1),
(2), (4) Date: Nov. 1, 2010

(87) PCT Pub. No.: WO2009/142887
PCT Pub. Date: Nov. 26, 2009

(65) Prior Publication Data
US 2011/0045747 A1    Feb. 24, 2011

Related U.S. Application Data

(60) Provisional application No. 61/055,186, filed on May 22, 2008.

(51) Int. Cl.
*B24B 1/00*    (2006.01)

(52) U.S. Cl. .......................................... 451/53; 451/552
(58) Field of Classification Search ................ 451/7, 53, 451/552
See application file for complete search history.

(56) References Cited

U.S. PATENT DOCUMENTS

| | | | |
|---|---|---|---|
| 3,745,722 A | | 7/1973 | Balz |
| 4,484,418 A | * | 11/1984 | Reich et al. ..................... 451/41 |
| 4,785,587 A | * | 11/1988 | Reich et al. ..................... 451/548 |
| 6,135,864 A | * | 10/2000 | Kenny et al. ..................... 451/59 |
| 6,299,516 B1 | | 10/2001 | Tolles |
| 2007/0295934 A1 | | 12/2007 | Kurata et al. |

OTHER PUBLICATIONS

International Search Report mailed by ISA/US on Jun. 17, 2009 for PCT/US09/42334.
Written Opinion mailed by IPEA/US on Aug. 3, 2010 for PCT/US09/42334.
International Preliminary Report on Patentability mailed by IPEA/US on Sep. 14, 2010 for PCT/US09/42334.

* cited by examiner

*Primary Examiner* — Maurina Rachuba
(74) *Attorney, Agent, or Firm* — James E. Walton; Noah A. Tevis

(57) ABSTRACT

An abrasive article is disclosed that is suitable for cleaning, sanding, scraping, or other such process of removing an outer layer or adherent matter. The abrasive article includes a plurality of abrasive particles at least partially embedded in a frozen liquid.

20 Claims, 1 Drawing Sheet

ABRASIVE ARTICLE

TECHNICAL FIELD

The present invention relates generally to abrading tools and articles, including processes, materials, and composition relating to abrading tools and articles, for example abrading tools or articles comprised of randomly situated sharp edges of a mass of natural or manmade (synthetic) mineral crystals.

DESCRIPTION OF PRIOR ART

Sheet-like abrasives, such as conventional sandpaper, are commonly used in a variety of sanding and cleaning operations including hand sanding of wooden surfaces and cleaning of metal surfaces. Conventional sandpaper is typically produced by affixing abrasive mineral to a relatively thin, generally non-extensible, non-resilient, non-porous backing (e.g., paper, film etc.). In hand sanding, the user holds the abrasive article directly in his or her hand, or attaches it to a sanding tool, such as a sanding block, and moves the abrasive article across the work surface. Sanding by hand can, of course, be an arduous task. Also, cleaning metal by sanding will work on certain types of metals, but not all metals. Titanium, for instance, should not be cleaned by sanding because debris will be ground into the metal, making adhesive bonding difficult or impossible.

Resilient sheet-like abrasive articles are also known in the patented prior art. U.S. Pat. No. 6,613,113 (Minick et al.), for example, discloses a flexible abrasive product comprising a flexible sheet-like reinforcing layer comprising a multiplicity of separated resilient bodies connected to each other in a generally planar array in a pattern that provides open spaces between adjacent connected bodies, each body having a first surface and an opposite second surface, and abrasive particles to cause at least the first surface to be an abrasive surface.

It would be desirable to provide a flexible resilient abrasive article that is durable, produces a more uniform scratch pattern, is easy and comfortable to use, has improved cut, and produces finer scratches than a sheet of sandpaper having a comparable grit size.

DESCRIPTION OF THE PREFERRED EMBODIMENT

Figure 1:
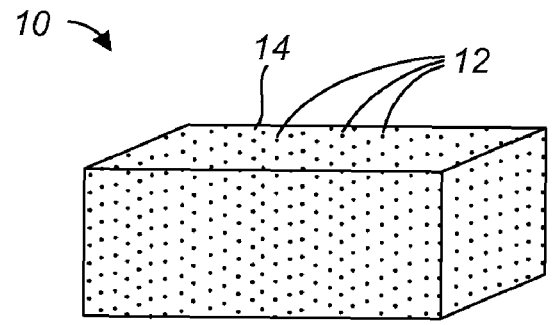
FIG. 1 shows a perspective view of an abrasive article according to the present disclosure.

Referring now to the drawings, FIG. 1 shows an abrasive article 10. The abrasive article 10 is useful for a wide variety of applications such as cleaning, sanding, scraping, or other such process of removing an outer layer or adherent matter. For example, the abrasive article 10 is useful for cleaning metal surfaces in preparation for adhesive bonding. The abrasive article 10 is also useful for removing paint without damaging the underlying parent material, which may be an easily damaged material such as a copper mesh or aluminum.

The abrasive article 10 includes a plurality of abrasive particles 12 at least partially embedded in a frozen liquid 14. In some embodiments, the abrasive particles 12 can include aluminum oxide and the frozen liquid 14 can include de-ionized water. However, other materials can be used. For example, the liquid 14 can include an additive or a solvent such as an alcohol, for example ethanol. Such additives can include selected additives that are chosen based on the surface being cleaned. For example, an additive such as peroxide or chromate may be used in order to activate the surface. The liquid 14 can be a water or water-alcohol solution that acts as an emulsion solution to bind up the particles 12. The liquid 14 can have preselected properties, for example pH level, tailored to the material to be treated with the abrasive article 10. For example, the liquid 14 can be selected so as to prevent oxidation of the surface being treated.

The abrasive article 10 can be manufactured by mixing the abrasive particles 12 with the liquid 14 while the liquid 14 is in a liquid state (i.e., the temperature of the liquid 14 is above the freezing temperature of the liquid 14). The mixture of abrasive particles 12 and liquid 14 is placed in a form or container that conforms to the desired shape of the abrasive article 10. The temperature of the mixture is then reduced at least until the liquid 14 is frozen.

The abrasive article 10 shown in FIG. 1 has been made in the form of a block having a plurality of generally planar surfaces. However, alternative embodiments of the abrasive article 10 can take on any desired shape. For example, alternative embodiments of the abrasive article 10 can be formed in the shape of a cube, cylinder, pyramid, cone, prism, or sphere. Alternative shapes may be desired, for example, so as to allow the abrasive article 10 to better conform to a surface to be cleaned. Any desired form can be achieved by allowing the abrasive article 10 to freeze while in a container that has the desired shape.

Figure 2:
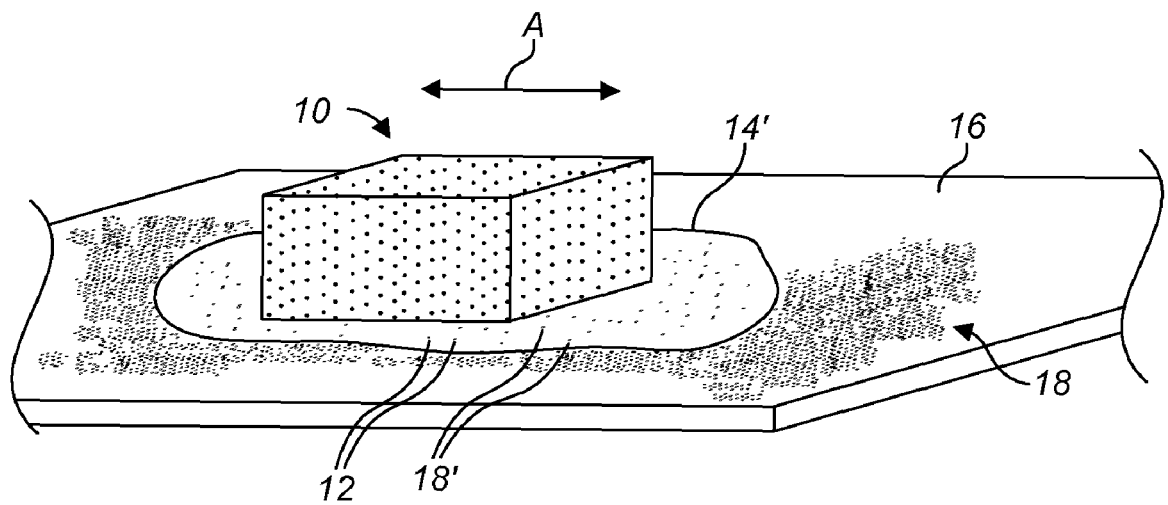
FIG. 2 shows a perspective view of the abrasive article shown in FIG. 1 in use for cleaning a surface.

Referring next to FIG. 2, which shows an example of a method of cleaning using the abrasive article 10. The abrasive article 10 can be used in a similar fashion as a conventional sanding block—one simply rubs the abrasive article 10 across a surface 16 to be cleaned, for example in directions shown as arrow A. In this example, the surface 16 includes contaminated regions 18 that may either be coated with various dirt, debris, residue, corrosion, paint or other undesired material. As a rubbing surface 20 of the abrasive article 10 is rubbed across the contaminated regions 18 of the surface 16, the abrasive particles 12 exposed at the rubbing surface 20 act to scrap away contaminates 18'. Also, the frozen liquid 14 at the rubbing surface 20 of the abrasive article 10 will begin to thaw as the rubbing surface 20 is rubbed back and forth across the surface 16. As the frozen liquid 14 thaws, the resulting thawed liquid 14' helps to wash away at least some of the loosened contaminates 18', such as corrosion particles and/or other contaminating debris.

As with conventional sand paper, the abrasive particles 12 gradually lose their abrasiveness as they scrape the surface 16. For this reason, when using conventional sandpaper, the sandpaper must periodically be replaced. In contrast, since the frozen liquid 14 of the abrasive article 10 is thawing at the rubbing surface 20 as the abrasive article 10 scrapes the surface 16, new abrasive particles 12 are constantly being exposed at the rubbing surface 20 of the abrasive article 10.

It should also be appreciated that abrasive particles 12 embedded in the thawed regions of the abrasive article 10 will also be carried away from the abrasive article 10 by the liquid 14'. The end result is a clean-water break-free surface. In some embodiments, the method can include rinsing the surface 16 while sanding, for example using a liquid from some source other than the abrasive article 10. The rinsing can be done during and/or after the sanding operation. After a thorough rinse (for example with de-ionized water) and drying, the treated surface is ready for bonding. It should also be appreciated that the liquid 14' carries away scraped-away particles from the surface 16 and contaminates 18'. Thus, unlike conventional sanding operations, the abrasive article 10 allows for sanding without dispersing dust into the air. This is a significant advantage, particularly where the surface 16 and/or contaminates 18 may include hazardous material.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. An article for removing an outer layer of an object in order to prepare a suitable bonding surface, the article consisting essentially of:
    a continuous body of frozen liquid, the body having opposing sides; and
    a plurality of abrasive particles disposed within the body of frozen liquid, the plurality of abrasive particles being dispersed within the body of frozen liquid between the opposing sides of the body of frozen liquid, such that the abrasive particles are newly being exposed as the article melts;
    wherein the abrasive particles are of sufficient hardness to abrasively scrape and remove the outer layer of the object;
    wherein the article is configured to be rubbed in a direction across the object.

2. The article according to claim 1, wherein the abrasive particles include particles of an abrasive material.

3. The article according to claim 2, wherein the abrasive particles include particles consisting essentially of aluminum oxide.

4. The article according to claim 3, wherein the frozen liquid comprises at least one of water, alcohol, chromate, and peroxide.

5. The article according to claim 4, wherein the body includes at least one substantially planar surface.

6. The article according to claim 5, wherein the body is configured and sized so to be controllably applied to the outer layer of the object by a human hand.

7. The article according to claim 1, wherein the frozen liquid comprises frozen de-ionized water.

8. The article according to claim 1, wherein the frozen liquid comprises alcohol.

9. The article according to claim 1, wherein the frozen liquid comprises ethanol.

10. The article according to claim 1, wherein the frozen liquid comprises a solution that includes water and alcohol.

11. The article according to claim 1, wherein the body includes at least one substantially planar surface.

12. A method of cleaning a surface in order to prepare the surface for bonding, the method comprising:
    applying an article to the surface, the article consisting essentially of:
        a continuous body of frozen liquid, the body having opposing sides; and
        a plurality of abrasive particles disposed within the body of frozen liquid, the plurality of abrasive particles being dispersed within the body of frozen liquid between the opposing sides of the body of frozen liquid; and
    rubbing the article across and against the surface such that at least some of the frozen liquid melts, thereby exposing at least some of the plurality of abrasive particles to the surface;
    allowing the article to thaw at the surface so that a melted portion of the article acts to wash away at least some of the contaminates;
    wherein the rubbing the article against the surface acts to remove an outer layer of contaminates.

13. The method according to claim 12, wherein the abrasive particles include particles consisting essentially of aluminum oxide.

14. The method according to claim 13, wherein the frozen liquid comprises at least one of water and alcohol.

15. The method according to claim 14, wherein the frozen liquid comprises a solution that includes water and alcohol.

16. The method according to claim 15 wherein the body includes at least one substantially planar surface.

17. An article for removing an outer layer of a contaminated object, the article comprising:
    a continuous body of frozen liquid, the body having an exterior surface and opposing sides; and
    a plurality of abrasive particles disposed within the body of frozen liquid, the plurality of abrasive particles including abrasive particles that are dispersed within the body of frozen liquid between the opposing sides of the body of frozen liquid, such that the plurality of abrasive particles are newly being exposed as the article melts, the plurality of abrasive particles also including abrasive particles that are supported by the body of frozen liquid and are at least partially exposed to the exterior surface of the body of frozen liquid;
    wherein the article is configured to be easily portable and does not require a platen in order to rub the article across the outer layer of the contaminated object.

18. The article according to claim 17, wherein the abrasive particles include particles consisting essentially of aluminum oxide.

19. The article according to claim 18, wherein the frozen liquid comprises at least one of water and alcohol.

20. The article according to claim 19, wherein the outer layer of the contaminated object is at least one of paint, primer, and corrosion.

* * * * *